United States Patent [19]

Vicenzi

[11] Patent Number: 4,759,799

[45] Date of Patent: Jul. 26, 1988

[54] ASBESTOS-FREE ASPHALT COATINGS

[75] Inventor: Stephen J. Vicenzi, Milton, Wis.

[73] Assignee: Exxon Chemical Patents Inc., Linden, N.J.

[21] Appl. No.: 898,650

[22] Filed: Aug. 21, 1986

[51] Int. Cl.⁴ .............................................. C08L 95/00
[52] U.S. Cl. .......................... 106/281 N; 106/218 R; 106/273 N; 106/278
[58] Field of Search ............... 106/273 N, 281 N, 277, 106/281 R, 283; 208/44

[56] References Cited

U.S. PATENT DOCUMENTS

| | | | |
|---|---|---|---|
| 3,928,061 | 12/1975 | Hellsten et al. | 106/281 N |
| 4,038,102 | 7/1977 | Hellsten et al. | 106/273 N |
| 4,166,752 | 9/1979 | Marzocchi et al. | 106/273 N |
| 4,335,186 | 6/1982 | Marzocchi et al. | 106/281 N |
| 4,554,023 | 11/1985 | Janichi | 106/273 N |

Primary Examiner—Josephine Barr
Attorney, Agent, or Firm—P. N. Jansson

[57] ABSTRACT

An improved asphalt roof-coating composition of the asbestos-free type which include asphalt cutback, clay, a surfactant, and fillers. An alkyloxyalkylamine salt surfactant, preferably an alkyloxypropylamine salt having an alkyl chain with from 10 to 20 carbon atoms is utilized in substantially lower amounts than required of surfactants in previous compositions. Excellent stable gel structure and easier blending are provided.

19 Claims, No Drawings

ASBESTOS-FREE ASPHALT COATINGS

FIELD OF THE INVENTION

This invention is related generally to asphalt-based coatings for roofs and the like and, more particularly, to asbestos-free asphalt coatings of the type including clay, a surfactant composition, and fillers.

BACKGROUND OF THE INVENTION

For many years asbestos has been used in combination with asphalt to produce a variety of coating compositions, such as roof coatings and roof cements. The asphalt is used as a binder and the asbestos is used for texture, strength, and the thixotropic properties which it imparts to the formulation.

Because of toxicity problems and the fact that asbestos may be a carcinogen, asbestos has fallen out or favor and in some places has been banned. For many types of products, including asphalt-based coatings, substitutes for asbestos have been found or developed.

Finding suitable substitute materials for asbestos for use in asphalt-based coatings has been a significant concern in the art. One approach which has been used with good success has involved combining clay, a quaternary ammonium salt surfactant composition, and fillers, together with an asphalt cutback.

The clay is for the purpose of achieving the gelling properties earlier provided by the traditionally-used asbestos. But clays have had to be used in conjunction with the quaternary ammonium salt cationic surfactants in order to develop optimum wetting and dispersion. Reducing the interfacial tension of the clay with the asphalt allows formation of a clay-asphalt dispersion to provide the thickened system. Such clay-thickened asphalt cutbacks, while developed primarily to overcome asbestos concerns, have shown some performance characteristics that exceed those shown by the previous asbestos-containing compositions.

The art had come to accept that such quaternary ammonium salts were the cationic surfactants necessary for effective use in such non-asbestos asphalt-based coating formulations. The most effective of these quaternary ammonium salt surfactants have been a small number of quaternary ammonium chlorides, such as the dialkyl quaternary ammonium chlorides and monoalkyl quaternary ammonium chlorides. Examples of these include Arquad 2C-75 (dicoco dimethyl ammonium chloride), Arquad T-50 (tallow trimethyl ammonium chloride), and 2HT-75 (dihydrogenated dimethyl ammonium chloride), all sold by Akzo Chemie Americas, of Chicago, Ill.

The quaternary ammonium chloride salt surfactants of asbestos-free asphalt-based coatings of the prior art, particularly the widely-used dialkyl quaternary ammonium chlorides, have a number of significant problems and drawbacks.

One significant problem is that, at room temperature such substances are solid or paste, which makes handling and blending difficult, so that typically they are solubilized into liquid surfactant compositions which are less than 100% active. The solvents present also raise concern about increased flammability hazards during the blending process.

Another significant concern relates to corrosivity. The widely-used quaternary ammonium chlorides can pose corrosion risks, particularly when the asphalt-based coatings containing such quaternaries are packaged and stored in metal containers or otherwise come into contact with corrosion-prone metals.

A very significant drawback is the considerable cost which use of the quaternary ammonium chloride salt surfactant compositions add to the cost of the roof-coating compositions. This cost relates to the relatively large amounts of such surfactant compositions which are required in order to provide asphalt based coating compositions with adequate gel qualities—that is, sufficient gel strength and thixotropy and, of equal importance, sufficient stability in gel qualities over time.

Formulations of the prior art, after addition of the quaternary surfactant composition and clay, are typically close to 90% asphalt cutback by weight, and the weight ratio of the clay to the surfactant composition generally varies from about 4:1 to about 7:1, depending on formulation variables. In comparison with the amounts of the other constituents used in these asphalt-based coating formulations, such as asphalt cutback, clay and fillers, the amount of surfactant used is small. However, the high relative cost of the surfactant composition (compared to the cost of the clay and asphalt cutback) causes even the small amount used to have an important impact on the cost of the total formulation.

Raising the ratio of clay to surfactant composition thus has the effect or reducing formulation cost. The amount of surfactant composition required depends on various factors, including the asphalt cutback chosen and the specific quaternary ammonium salt chosen. For any type of formulation, however, the right amount of surfactant composition must be present to provide good gel structure and stability.

In summary, a number of drawbacks and problems exist in the art relating to asbestos-free asphalt-based coatings. There is a need for an improved asbestos free formulation.

OBJECTS OF THE INVENTION

It is an object of this invention to provide an improved asbestos free asphalt-based coating composition overcoming problems and shortcomings of the prior art.

Another object of this invention is to provide an asbestos-free asphalt-based coating composition for roofs and the like which has improved gel qualities with low amounts of surfactant composition.

Another object of this invention is to provide an asbestos-free asphalt-based coating composition for roofs and the like which requires less surfactant composition in its blending than prior asbestos-free coating compositions.

Another object of this invention is to provide an asbestos-free asphalt-based coating composition for roofs and the like which is easy to blend.

Another object of this invention is to provide an asbestos-free asphalt-based coating composition with reduced flammability concerns, particularly during blending.

Another object of this invention is to provide an asbestos-free asphalt-based coating composition with improved corrosion protection for metal surfaces such that it can be stored in metal containers with greater confidence.

These and other important objects will be apparent from the descriptions of this invention which follow.

SUMMARY OF THE INVENTION

This invention is an improved asphalt roof-coating composition of the asbestos-free type including clay, surfactant composition, and fillers. The composition includes about 80–95 parts by weight of a roof-coating asphalt cutback, about 5–20 parts by weight of clay, and fillers to obtain the desired bulk. The composition, however, includes an alkyloxyalkylamine salt surfactant present in an amount to provide stable gel structure. Alkyloxypropylamine salts with an alkyl chain having from 10 to 20 carbon atoms are preferred, with an alkyl chain of 10 to 15 carbon atoms highly preferred.

The amount of such cationic surfactant composition which is effective in providing the best gel qualities, including the best gel stability, is significantly less than the amount of quaternary ammonium salt surfactant composition required in blends of the prior art. The alkyloxypropylamine salt surfactants used in this invention are usable in a 100% active form, unlike the quaternary ammonium salt surfactant compositions of the prior art.

This need for less surfactant composition has been found to be the case for a variety of formulations, including formulations involving different asphalt cutbacks. This, of course, significantly reduces the cost of the coating composition, providing an important advantage.

Given that asphalt cutback is the predominant constituent of the formulation and that the amount of asphalt cutback with respect to the amount of clay and surfactant composition does not vary greatly, the amount of surfactant composition used is best expressed in inverse ratio to the amount of clay. Thus, C/S=weight % clay/weight % surfactant composition. The higher the C/S ratio is, the lower the amount of surfactant composition used.

Depending on the asphalt cutback used and other factors, the C/S ratio can be from about 7:1 to about 10:1, in each case a higher ratio than is possible with the same formulation using the quaternary ammonium salt surfactant compositions previously used for asphalt-based coatings. Formulations in which the C/S ratios are at least about 8:1 are particularly preferred because they provide good performance at exceptionally low cost.

In the most highly preferred embodiments of this invention, the alkyloxypropylamine salt will have an alkyl chain with 10 carbon atoms. And, in the most preferred embodiments, the surfactant is an acetate salt.

As noted, the alkyloxypropylamine salts, including the most preferred decyloxypropylamine acetate, are liquid at room temperature—and thus easily usable 100% active. Therefore, this invention provides a substantial advantage over the prior art in that the asphalt-based coating compositions can be blended much more easily. There is no need to take separate steps to solubilize the surfactant. And, the flammability risks are reduced in the blending procedures.

The preferred alkyloxypropylamine salts, including the most preferred decyloxypropylamine acetate, also do not have corrosion concerns. They can be packaged and stored in metal containers, and be placed into contact with corrosion-prone metal surfaces with confidence.

In preferred embodiments of this invention, attapulgite clays are used. Such clays, which have been widely used in the non-asbestos systems of the prior art, are principally mined by Engelhard Corporation and the Floridin Company. The attapulgite clays are specially-sized and processed gelling clay products suitable for thickening asphalt-based coatings. Attapulgite clays have distinct hollow needle-like crystalline structures.

The alkyloxyalkylamine salt surfactants used in this invention would not seem appropriate for asphalt-based coating compositions. The quaternary ammonium salt surfactants used in the prior art are essentially completely ionized in solution. In contrast, the alkyloxyalkylamine salts used in this invention are not fully ionized in solution; indeed, only a small part is ionized. Therefore, to use such surfactants with clay in asbestos-free asphalt-based coating compositions was contrary to the state of the art and to obtain excellent gel characteristics was unexpected.

While not wanting to be bound by theoretical considerations, it may be that the surfactants used in this invention interact with the hollow needle-like attapulgite clay structures in some unexpected fashion to give unexpected favorable gel characteristics to the compositions. It is conjectured that the alkyloxyalkylamine salts, which are less bulky and differently-shaped than the quaternaries, have their surfactant ions more accessible to reactive sites along the hollow needle-like crystalline structures of the attapulgite clays. Such greater accessibility may allow the surfactant ions in the inventive formulations to be sorbed more easily onto the crystalline structures to provide the excellent gel network.

It would appear that, within the preferred range of alkyloxypropylamine salt surfactants used in this invention, greater molecular weights in the surfactant, that is, the number of carbon atoms being closer to the upper end of the acceptable range, provide somewhat lower degrees of gellability in the final composition. Thus, to provide equivalent properties it tends to be necessary to use greater amounts of the surfactant when the surfactant has more carbon atoms in its alkyl chain.

The asphalt cutbacks best usable in this invention may be medium-cure (MC) cutbacks, rapid-cure (RC) cutbacks, or even slow-cure (SC) cutbacks. The solvents in such asphalt cutbacks, such as mineral spirits, naphtha and No. 2 fuel oil, are a primary factor in determining the speed of cure of the coating compositions. Examples of suitable asphalt cutbacks for use in this invention are: Exxon 7057, an MC cutback available from Exxon Corporation, Houston, Texas; Gardner cutback, an MC cutback available from Gardner Asphalt Company, Tampa, Fla.; Trumbull 1660, available from Trumbull Asphalt, Summit, Ill.; and the asphalt cutback from Seaboard Asphalt Products Company, Baltimore, Md. Suitable asphalt cutbacks are available from many sources.

Examples of suitable clays include: Min-U-Gel AR, an attapulgite available from Floridin Company, Berkeley Springs, WV, and attapulgites known as ATTA-GEL 36, 40, 50 and 2059, available from Engelhard Corporation, Edison, N.J. Such clays are available commercially in different particle sizes. Other clays may be used, but the attapulgites are highly preferred.

The alkyloxypropylamine salt surfactants preferred for use in this invention include those preferably having from 10 to 20 carbon atoms in their alkyl chains, and include a variety of salts including the most preferred acetates. Certain of the preferred alkyloxypropylamine acetates are available from Exxon Chemical Americas, of Milton, Wis.; such compositions are identified as PA-14 acetate through PA-24 acetate, respectively. Those having from 10 to 15 carbon atoms in their alkyl chains (PA-14 acetate to PA-19 acetate) are preferred, the most preferred being those with 10 carbon atoms (PA-14 acetate).

The best (highest) C/S ratios are obtained using alkyloxypropylamine salt surfactants with fewer carbons within the 10 to 20 range; thus, the preference for those with 10-15 carbon atoms in their alkyl chains and the greatest preference for those with 10. At the upper end of the acceptable range the C/S ratios tend to fall. And, more of the surfactant may be required to obtain suitable gel characteristics.

Examples of other acceptable alkyloxypropylamine salts include the formates, the hydrochlorides, the propionates, and the hydroxyacetates.

While the clay and an alkyloxypropylamine salt surfactant provide the primary gel network for entrapment of the asphalt cutback, fillers are also used, as in the prior art. Fillers are bulking agents which reinforce the composition after application. Such bulking fillers are also added for favorable economics and shrinkage control. Examples of acceptable fillers are sand, mica, ground slate, diatomaceous earth, ground limestone, wollastonite, pearlite, cellulosic fibers, talc, and polyolefin fibers. Fillers are added in amounts as needed to provide desired properties in the composition.

The viscosity of the compositions of this invention may be described as pseudoplastic and thixotropic. Such properties are shown by: the gel strength of the compositions; their relatively high viscosity at low shear rates; their relatively low viscosity at high shear rates; their good uniformity in viscosity reduction in response to uniform shear applied over a period or time; and their good recoverability, that is, recovery of initial properties after shear has ended.

The gel strength contributes to stabilizing the final coating composition against settling over long periods in storage. The high viscosity at low shear rates maintains mix uniformity during processing, packaging and application. The low viscosity at high shear rates makes application easier. And the good recoverability of viscosity minimizes sag and flow after application while solvent evaporation is occurring.

PREPARATION OF THE COMPOSITIONS

A number of factors must be considered in connection with preparing compositions in accordance with this invention. Among these are the relative amounts of clay and asphalt cutback, the type of asphalt cutback, the C/S ratio previously mentioned, the exact type of alkyloxypropylamine salt to be used, the nature of the processing equipment available, the order of addition, the mixing times, and the types and amounts of other fillers.

While the processing steps are not critical and considerable variation is possible, certain blending procedures are preferred. And, the preferred procedures are different for low-shear blending equipment, such as paddle and ribbon mixers, than they are for high-shear equipment.

If high-shear mixer is used, the preferred order of addition involves first mixing the asphalt cutback, surfactant, and clay until they are gelled. Then the fillers are added and mixed with the gelled composition.

If low-shear equipment is employed (or if the clay concentration is low in a high-shear mixer batch), the use of a pre-gelling technique is recommended to enhance gelling and optimize dispersion. The preferred pre-gelling process consists of thoroughly mixing all of the alkyloxypropylamine salt surfactant with all of the clay and a portion of the asphalt cutback (preferably about two-thirds) until a thick gel is formed. Then the remainder of the cutback and all of the filler(s) are added and thoroughly mixed.

In either case, additional solvent can be added if required after the mix is uniform. In such cases, it is preferred to add the solvent that is in the asphalt cutback.

The choice and amount of fillers added in the mix depend in part upon whether the composition is to be a brushable roof coating, a sprayable coating, or a roof cement. The desired final viscosity and texture of the asphalt coating composition will be determined by the fillers which are added.

Determining the optimum amount of alkyloxypropylamine salt surfactant in a coating is critical. The optimum is considered the least amount (that is, the highest C/S ratio) providing the desired gel characteristics and excellent gel stability. The optimum ratio depends primarily on the specific alkyloxypropylamine salt selected, the asphalt cutback used, the degree of asphalt oxidation, and the clay used. Therefore, an optimum ratio must be determined for each combination.

One method of determining the optimum C/S ratio is to run a ladder of C/S ratios in a mix of a particular ratio of the chosen clay to the combination of the surfactant and chosen asphalt cutback—for example, 12 parts by weight clay to 88 parts by weight asphalt cutback and surfactant combined. (This 12 to 88 weight ratio is one example of a starting ratio for asbestos-free asphalt-based coating compositions, and it is usable with this invention. However, in running such optimization tests this ratio can be varied within the acceptable range of the relative amounts of clay and asphalt cutback.

The C/S ratio may then be varied in 0.5/1 increments (within what is considered an acceptable range), and readings on the gel characteristics of the resulting compositions should be taken at periodic intervals after mixing (such as 24 and 36 hours and several times during a week until a final reading one week after mixing). Temperature and pressure conditions should preferably be controlled during the period of such testing.

The range of ratio increments tested need not be broad, but may start, for example, around 7:1 and extend to perhaps 10:1 or 11:1. Once the optimum C/S ratio is established for a particular asphalt cutback and thickener, it can be used with confidence in production of coating compositions of this invention made with such cutback and thickener at the predetermined thickener to cutback ratio.

The instruments and procedures for measuring gel characteristics will not be described here. It is preferred that the recommended ASTM test procedures be used, but any appropriately sensitive test instrument (such as a good penetrometer) and reliable test procedure will be acceptable if properly used.

Large variations in the readings of the gel characteristics over the course of the test period indicate a lack of gel stability. This tends to indicate an unacceptable C/S ratio or some other unacceptable characteristic in the formula. Steady readings are what is desired, provided they show sufficient gel strength.

EXAMPLES OF THE INVENTION

In each of the examples which follow, an asbestos-free asphalt-based coating composition was made using either low-shear or high-shear blending techniques, adding and mixing the listed constituents in the manner described above. For each example the formulation is listed and comments regarding the formulation or the resulting composition are given.

EXAMPLE 1

| | |
|---|---|
| Seaboard Asphalt Products asphalt cutback | 91 parts |
| Min-U-Gel AR | 8 parts |
| PA-14 Acetate | 1 parts |
| Interfibe 463 (Sullivan Chemical, Cleve, OH) (a cellulosic fiber material) | 4 parts |
| 200 mesh limestone (James River) | 41 parts |

This composition is preferably blended using a low-shear blending technique. The resulting composition has been found to provide an excellent asphalt roofing coating composition.

EXAMPLE 2

| | |
|---|---|
| Exxon 7057 asphalt cutback | 86.5 parts |
| ATTAGEL 36 | 12 parts |
| PA-14 Acetate | 1.5 parts |
| −325 mesh silica | 21 parts |

This formulation provides a composition which is an excellent roof cement.

EXAMPLE 3

| | |
|---|---|
| Exxon 7057 asphalt cutback | 80 parts |
| ATTAGEL 36 | 18.5 parts |
| PA-14 Acetate | 2.3 parts |
| Talc | 21 parts |
| Interfibe 231 fiber | 3 parts |

This composition, blended by either a low-shear or a high-shear technique, provides a fibrated roof cement.

EXAMPLE 4

| | |
|---|---|
| Trumbull 1660 asphalt cutback | 86.8 parts |
| ATTAGEL 36 | 12 parts |
| PA-14 acetate | 1.2 parts |
| Sand | 21 parts |
| Ground slate | 5 parts |

This composition has a 10:1 C/S ratio, yet exhibits good gel stability, gel strength, and thixotropy. The composition represents a roof cement.

EXAMPLE 5

| | |
|---|---|
| Asphalt cutback | 85 parts |
| ATTAGEL 36 | 14 parts |
| PA-14 formate (from Exxon Chemical Americas) | 2 parts |
| Interfibe 231 | 3 parts |
| Limestone | 19 parts |

This composition illustrates the use of a alkyloxypropylamine salt other than the most preferred acetate. Other salts of PA-14 can be used instead.

EXAMPLE 6

| | |
|---|---|
| Gardner asphalt cutback (MC) | 86.5 parts |

-continued

| | |
|---|---|
| ATTAGEL 36 | 12 parts |
| PA-16 acetate | 1.5 parts |
| Diatomaceous earth | 18 parts |
| Interfibe 231 | 3 parts |

This composition represents a fibrated roof coating, having good gel stability.

EXAMPLE 7

| | |
|---|---|
| Exxon 7057 asphalt cutback | 84 parts |
| ATTAGEL 40 | 14 parts |
| PA-19 acetate | 2 parts |
| −200 mesh limestone (James River) | 30 parts |

This composition, having a 7:1 C/S ratio, exhibits good gel characteristics, and represents a roof coating.

EXAMPLE 8

| | |
|---|---|
| Exxon 7057 asphalt cutback | 86 parts |
| ATTAGEL 36 | 12 parts |
| PA-24 acetate | 2 parts |
| −200 mesh limestone (James River) | 15 parts |
| Interfibe 231 | 3 parts |

This composition represents a coating utilizing alkyloxypropylamine salt with 20 carbon atoms.

EXAMPLE 9

| | |
|---|---|
| Exxon 7057 asphalt cutbacks | 94 parts |
| ATTAGEL 50 | 5.3 parts |
| PA-14 acetate | 0.7 parts |
| −200 mesh limestone | 10 parts |
| Interfibe 231 | 3 parts |

This represents a high-asphalt content roof coating composition utilizing a finer grade of attapulgite clay.

The compositions of this invention are applied to various surfaces in the same manner as the compositions of the prior art are applied. They are usable as roof coatings, roof cements, vehicle undercoatings, pipe coatings, mastics and adhesives, and for many other purposes.

While the principles of this invention have been described in connection with specific embodiments, it should be understood clearly that these descriptions are made only by way of example and are not intended to limit the scope of the invention.

What is claimed:

1. In an asphalt roof-coating composition of the asbestos-free type including clay and a surfactant, the improvement comprising:
   about 80–95 parts by weight of a roof-coating asphalt cutback;
   about 5–20 parts by weight of clay;
   an alkyloxypropylamine salt surfactant with an alkyl chain having from 10 to 20 carbon atoms, said surfactant present in an amount to provide stable gel structure; and
   fillers in an amount to provide the desired bulk.

2. The composition of claim 1 wherein the clay to surfactant ratio is at least about 8:1.

3. The composition of claim 1 wherein the alkyl chain has from 10 to 15 carbon atoms.

4. The composition of claim 3 wherein the alkyl chain has 10 carbon atoms.

5. The composition of claim 1 wherein the surfactant is an acetate salt.

6. The composition of claim 1 wherein the clay is attapulgite.

7. The composition of claim 1 wherein the surfactant is decyloxypropylamine acetate.

8. The composition of claim 7 wherein the clay is attapulgite.

9. The composition of claim 8 wherein the clay to surfactant ratio is at least about 8:1.

10. In an asphalt roof-coating composition of the asbestos-free type including a surfactant and a clay with hollow needle-like crystalline structures, the improvement comprising:
- about 80–95 parts by weight of a roof-coating asphalt cutback;
- about 5–20 parts by weight of said clay;
- fillers in an amount to provide the desired bulk; and
- an alkyloxyalkylamine salt surfactant present in an amount to provide stable gel structure.

11. The composition of claim 10 wherein the clay is attapulgite.

12. The composition of claim 11 wherein the clay to surfactant ratio is at least about 8:1.

13. The composition of claim 11 wherein the surfactant is an alkyloxypropylamine salt with an alkyl chain having from 10 to 20 carbon atoms.

14. The composition of claim 13 wherein the alkyl chain has from 10 to 15 carbon atoms.

15. The composition of claim 14 wherein the alkyl chain has 10 carbon atoms.

16. The composition of claim 14 wherein the surfactant is an acetate salt.

17. The composition of claim 14 wherein the surfactant is decyloxypropylamine acetate.

18. The composition of claim 17 wherein the clay to surfactant ratio is at least about 8:1.

19. The composition of claim 10 wherein the alkyloxyalkylamine salt is an alkyloxypropylamine salt.

* * * * *